United States Patent [19]

Smulders et al.

[11] 4,398,935
[45] Aug. 16, 1983

[54] METHOD AND DEVICE FOR THE HIGH-PRECISION MANUFACTURE OF GLASS ARTICLES, IN PARTICULAR LENSES

[75] Inventors: Hendricus F. G. Smulders; Gerrit E. Bartman, both of Eindhoven, Netherlands

[73] Assignee: U.S. Philips Corporation, New York, N.Y.

[21] Appl. No.: 344,686

[22] Filed: Feb. 1, 1982

[30] Foreign Application Priority Data

Oct. 29, 1981 [NL] Netherlands .......................... 8104895

[51] Int. Cl.³ ............................................. C03B 11/16
[52] U.S. Cl. .......................................... 65/64; 65/102; 65/160; 65/244; 65/323
[58] Field of Search ................... 65/64, 102, 122, 160, 65/244, 323, 305, DIG. 1

[56] References Cited

U.S. PATENT DOCUMENTS 3,306,723  2/1967  Forber .............................. 65/305 X
3,860,408  1/1975  Mastik ............................... 65/305 X
4,295,873 10/1981  Trutner et al. ..................... 65/102 X

OTHER PUBLICATIONS

Fabrication of Lens Blanks Having Reduced Finishing Allowances, Sov. J. Opt. Technol. 48(8) Aug. 1979, pp. 474-475 (Standel et al.).

Primary Examiner—Robert L. Lindsay, Jr.
Attorney, Agent, or Firm—Paul R. Miller

[57] ABSTRACT

A method of and a device are provided for the high-precision manufacture of glass lenses where a roughly metered volume of softened glass is transferred in a product holder from a furnace to a position between two moulds, the moulds being subsequently moved towards one another and the excess glass being pressed from between the moulds. The moulds and the product holder are moved at such a mutual speed that both moulds simultaneously contact the article, and the movement of the moulds is terminated when they reach a given position with respect to one another.

8 Claims, 3 Drawing Figures

METHOD AND DEVICE FOR THE HIGH-PRECISION MANUFACTURE OF GLASS ARTICLES, IN PARTICULAR LENSES

The invention relates to a method for the high precision manufacture of glass articles, in particular lenses, where a roughly metered volume of glass is transferred from a furnace to a position between two moulds, after which the moulds are moved towards one another so that the excess glass between the moulds is pressed away.

A method of this kind is disclosed in U.S. Pat. No. 3,306,723. According to this known method, a glass charge having a high temperature is transferred directly from the furnace to a position between the moulds. Subsequently, the moulds are closed, the excess glass between the moulds being pressed away and the mould movement being terminated in that the moulds abut against one another.

Some excess glass will then always remain between the moulds, so that the metering of the moulded product can never satisfy very high requirements as regards precision.

It is an object of the invention to provide a method and device for the manufacture of glass articles where the articles manufactured satisfy very severe requirements as regards precision and surface and which is also particularly suitable for the manufacture of aspherical lenses.

The method in accordance with the invention is characterized in that a roughly preformed glass product in a product holder is heated in a furnace until its material softens, after which the softened product is moved to a position between the moulds and the moulds are moved towards one another, the moulds and the product holder being moved at such a mutual speed that both moulds simultaneously contact the roughly preformed product, the movement of the moulds being terminated when they are situated at a given distance from one another.

The method in accordance with the invention utilizes a roughly preformed glob of glass which need not have accurately defined dimensions within given limits. This preform is heated to a softening temperature in a furnace, after which it is arranged between two moulds which simultaneously contact the glass during their closing movement, so that the dissipation of heat to the moulds is the same on both sides.

The mould movement is ended when the moulds are situated at a given distance from one another. The excess glass between the moulds has then been pressed to the sides. The basic consideration in this respect is that for a lens actually only the lens surfaces are important, in particular their surface condition and their mutual position. The other surfaces of the articles are actually not important. Thus according to the method in accordance with the invention, the lens surfaces are moulded at the correct location in a softened preform. If desirable, the preform may be accommodated in a product holder which serves as a mount for the finished article after moulding.

The device for performing the method in accordance with the invention is characterized in that the device comprises, in addition to the moulds, one or more stations for taking up a product holder in which a roughly preformed product can first be introduced into a softening furnace and subsequently between the moulds, wherebetween there is provided a product guide which couples the product holder to the drive of at least one of the moulds so that during the movement of the moulds towards one another the moulds simultaneously contact the product, there also being provided an electric stop for terminating the mould movement when the moulds are situated at a given prescribed distance from one another.

Generally, one of the moulds will be arranged to be stationary and the softened preformed product will be introduced halfway between the moulds. By the product guide, the product can reach half the speed of the moving mould, so that both moulds simultaneously contact the product.

The ultimate position of the moulds is determined by an electric stop which is preset so that the force on the product to be moulded is zero when the electric stop indicates zero; this can be achieved with a very high accuracy thanks to the absence of resultant forces. Because the moulds are not closed in the ultimate position, the forces in the product will be small when the ultimate position is approached so that the ultimate dimensional accuracy will be higher. The absence of the forces is due to the fact that there is no counter force other than the viscous resistance of the softened glass.

In order to ensure a high precision of the moulding device, one of the moulds in a further embodiment is arranged to be stationary in a frame, the other mould being accommodated in an arm construction which is rotatably connected to the frame with the pivots comprising pre-loaded bearings. Thus, a very rigid moulding device without play is obtained.

In order to enable correction of any very small errors in the alignment of the moulds, both pivots in a further embodiment are accommodated in two parallel plates which comprise U-shaped cuts around the pivots. A given elasticity in the plates is thus obtained, so that the pivots are adjustable.

In order to ensure that temperature differences cannot lead to undesirable shifts in this construction, each of the moulds in a further embodiment is connected to the plates by way of a triangular system of tubes with each of the systems of tubes being connectable to an inlet and outlet for cooling medium.

The invention will be described in detail hereinafter with reference to the drawing.

Figure 1:
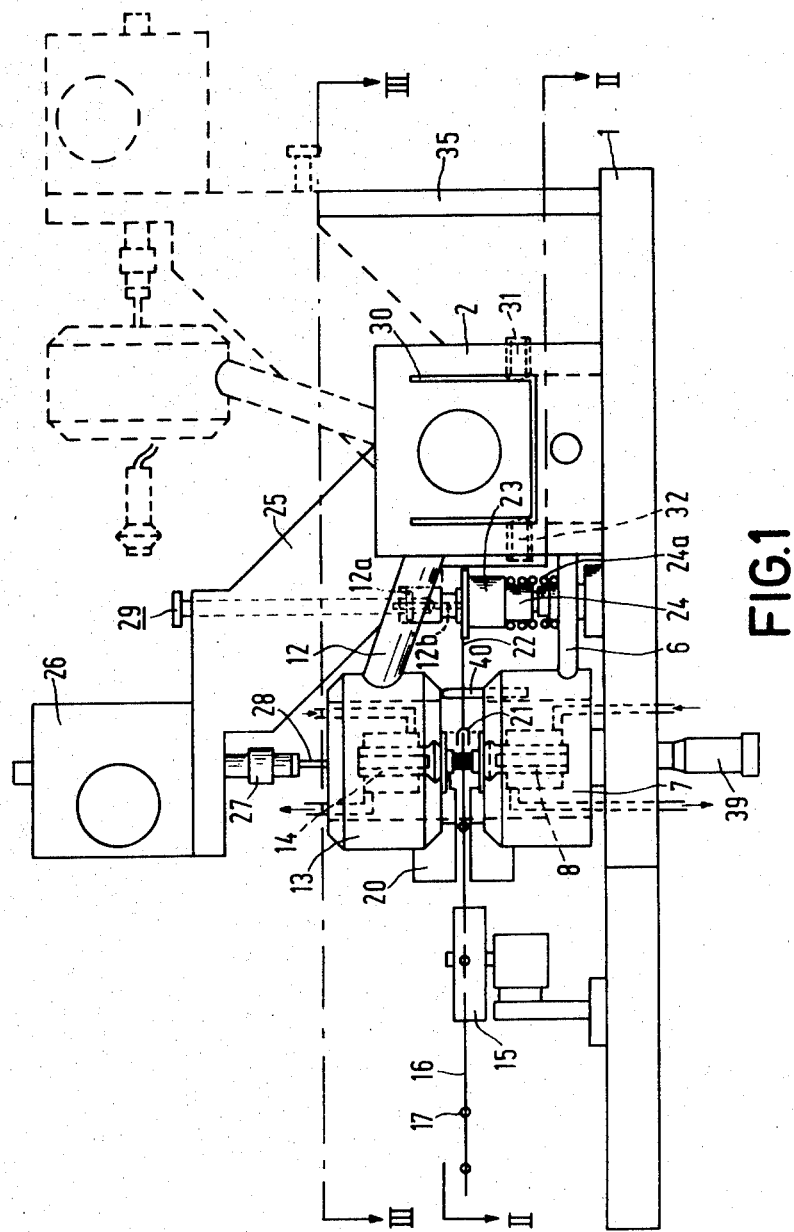
FIG. 1 is a diagrammatic side elevation of an embodiment of a moulding device for the manufacture of glass articles.
Figure 2:
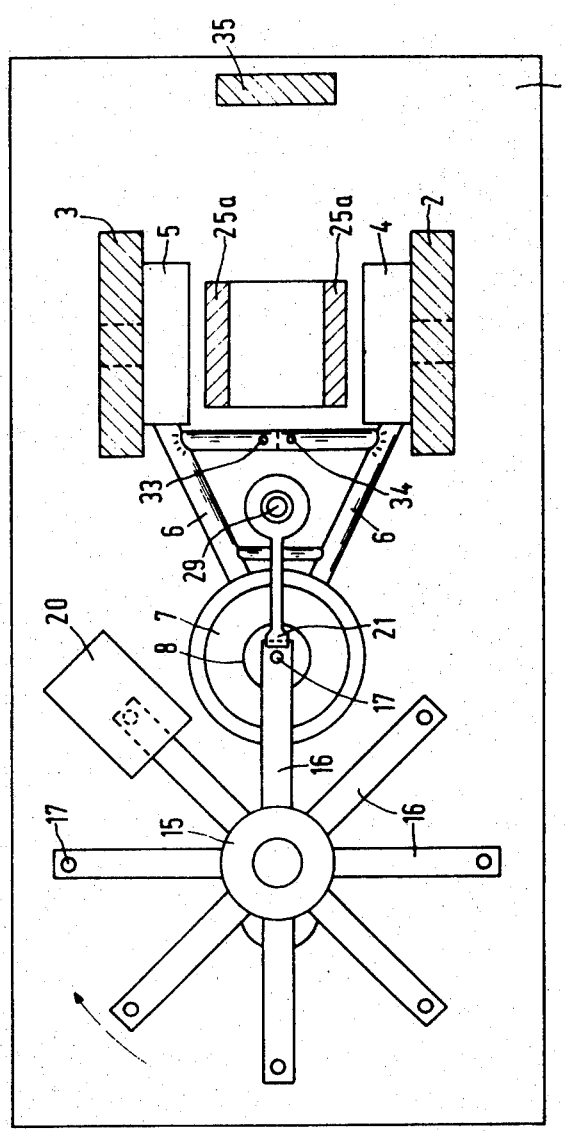
FIGS. 2 and 3 are sectional views taken along the lines II—II and III—III, respectively, of the device shown in FIG. 1.
Figure 3:
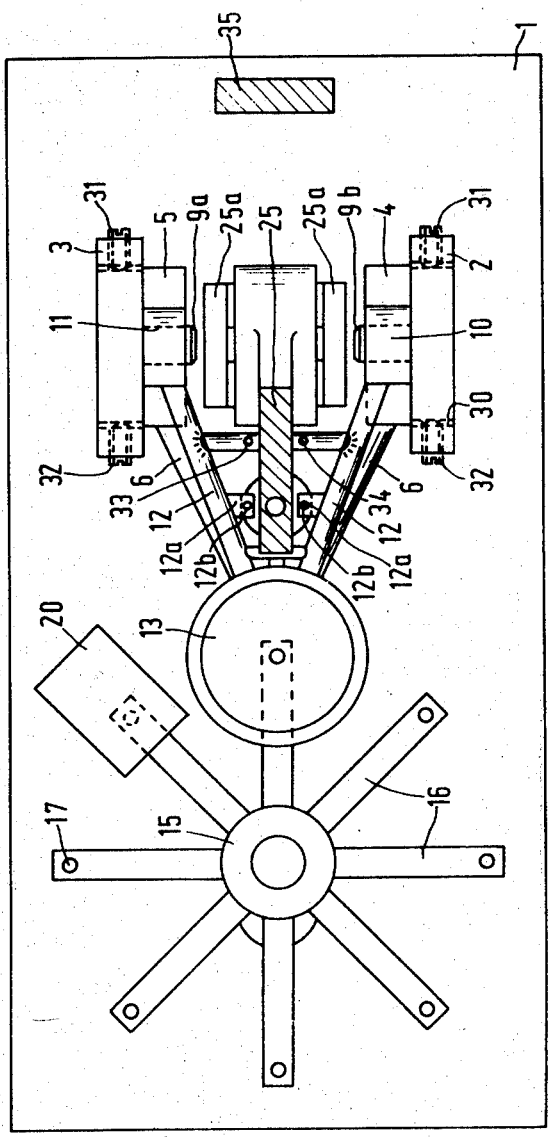

The reference numeral 1 in the FIGS. 1, 2 and 3 denotes a base plate. On the base plate there are arranged two parallel flanges 2 and 3. A system of tubes 6 is connected to the flanges 2 and 3 by two blocks 4 and 5. The other side of the system of tubes 6 is connected to a mould holder 7 which carries a lower mould 8. The flanges 2 and 3 carry pins 9a and 9b on which a system of tubes 12 is pivotably journalled by way of pre-loaded ball bearings 10 and 11. The system of tubes 12 supports a mould holder 13 in which an upper mould 14 is accommodated.

The device furthermore comprises a rotary table 15 with a number of projecting arms 16, each of which comprises a product holder 17. The rotary table can be intermittently moved by a drive (not shown). During this movement, the product holders pass through a number of positions, one of which is formed by a furnace 20 in which a roughly preformed product present in the product holder is softened. In the next position, the softened product arrives between the moulds 8 and 14. In this position, the relevant arm 16 is situated between the grip 21 of a product guide 22. The guide 22 is connected to a part 23 which is movably arranged on a guide 24 which is mounted on the base plate 1 and which is pressed upwards by a spring 24a.

An arm 25 is pivotably journalled on blocks 25a. The arm 25 supports a motor with drive 26 which is capable of moving a press rod 27 more or less up and down. The press rod 27 is connected to the mould holder 13 by leaf springs 28. The arm 25 supports a blocking member 29 whereby the arm 25 can be connected to the guide 24 in a suitable position.

In this embodiment of the moulding device, the part 23 is arranged halfway between the center line of the mould and the center line of the pins 9a and 9b. Furthermore, the system of tubes 12 comprises plates 12a in which there are accommodated adjusting screws 12b which come into contact with the part 23. This means that when the moulds are closed, the part 23 moves with the mould 14 at half the speed at the instant at which the adjusting screws 12b engage the part 23.

It is very important that the center lines of the moulds 8 and 14 are exactly coincident. Regardless of the precision of the manufacture of the various parts, some tolerances will always be present, which may give rise to some deviations of the center lines of the moulds 8 and 14. In order to correct for such a deviation, the flanges 2 and 3 are provided with a U-shaped cut 30 around the pins 9a and 9b. Consequently, a given elasticity is imparted to these parts of the flanges and the center line of the pins 9a and 9b can be slightly adjusted by means of the adjusting screws 31 and 32, so that the center line of the upper mould 14 can be adjusted in the horizontal x-y direction.

In order to minimize temperature influences, the systems of tubes 6 and 12 are constructed to be hollow and comprise connections 33 and 34, respectively, for the inlet and outlet of a cooling liquid. The mould holders 7 and 13 also comprise a cooling circuit 7a and 13a, respectively, for the cooling of the moulds 8 and 14.

In order to enable adaptation of the position of the lower mould holder 7 to different product heights there is provided an adjustment device 39. For the exchanging of the moulds 8 and 14, the moulding device can be put in a completely open position, as denoted by broken lines in FIG. 1. The arm 25 then bears against an abutment 35 on the base plate.

The operation of this device is as follows. Roughly preformed products are arranged in the product holders 17. The rotary table 15 successively transports the product holders to a furnace 20 in which the preformed products are heated to a softening temperature. Subsequently, the product holder with the product is transferred from the furnace to a position between the moulds 8 and 14, the arm 16 then being positioned between the grip 21 of the product guide 22. Subsequently, the motor and the drive 26 start to move the mould holder 13 downwards. At the instant at which the adjusting screws 12b engage the product guide 22, the product is situated exactly halfway between the moulds. The product subsequently moves with the upper mould 14 at half the speed, which means that the two moulds will engage the product at exactly the same instant.

An electric stop, usually an inductive distance indicator 40, ensures that both moulds are displaced until they reach the desired position.

What is claimed is:

1. A method for high-precision manufacture of glass articles, including optical lenses, comprising;
    heating a roughly metered volume of glass in a product holder in a furnace until softening to form a roughly preformed glass product,
    moving at least two mould sections and said product holder toward each other at such mutual speeds that said mould sections simultaneously contact said roughly preformed glass product, and
    terminating movement of said mould sections toward each other at a given separation from one another.

2. A method according to claim 1, wherein said movement is terminated before said two mould sections are in contact.

3. A device for high-precision manufacture of glass articles comprising;
    at least two mould sections being movable relative to one another,
    product holder means for holding a roughly preformed glass product,
    transport means for moving said product holder means through a plurality of positions including a first position providing a softening furnace for softening said glass product and a second position between said two mould sections,
    driving means for driving at least one of said two mould sections toward the other,
    product guide means for coupling said product holder means to said driving means,
    said driving means providing simultaneous contact between said two mould sections and said glass product, and
    electric stop means for terminating movement of said mould sections at a predetermined separation from one another.

4. A device according to claim 3, wherein one of said two mould sections is rigidly mounted in a frame, and the other of said two mould sections is accommodated in a pivotable arm construction, said pivotal arm construction being pivotably connected to said frame, and wherein pivots of said pivotable arm construction include pre-loaded revolution bearings.

5. A device according to claim 4, wherein said pivots are accommodated in two parallel plates, each including U-shaped cuts around said pivots.

6. A device according to claim 5, wherein each of said two mould sections is connected to said plates by a triangular system of tubes connecting a cooling fluid, and wherein each of said systems are connected to an inlet and an outlet for said cooling fluid.

7. A device according to claim 3, wherein one of said mould sections is fixed in position, the other of said mould sections is moved toward said one mould section at a first speed, and said product holder means is moved toward said one mould section at half said first speed.

8. A device according to claim 3, wherein said product holder means holds said preformed glass product between said two mould sections.

* * * * *